(12) United States Patent
Wang et al.

(10) Patent No.: US 9,935,796 B2
(45) Date of Patent: Apr. 3, 2018

(54) SUPERPOSED SIGNAL SAMPLING APPARATUS AND SAMPLING METHOD

(71) Applicant: General Electric Company, Schenectady, NY (US)

(72) Inventors: Lifeng Wang, ShangHai (CN); Xiaojie Wu, ShangHai (CN); Xianhong Yang, ShangHai (CN)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/122,490

(22) PCT Filed: Feb. 13, 2015

(86) PCT No.: PCT/US2015/015851
§ 371 (c)(1),
(2) Date: Aug. 30, 2016

(87) PCT Pub. No.: WO2015/138086
PCT Pub. Date: Sep. 17, 2015

(65) Prior Publication Data
US 2017/0078121 A1  Mar. 16, 2017

(30) Foreign Application Priority Data

Mar. 13, 2014 (CN) .......................... 2014 1 0092951

(51) Int. Cl.
*H04W 4/00* (2009.01)
*G08B 29/00* (2006.01)
(Continued)

(52) U.S. Cl.
CPC .......... *H04L 25/062* (2013.01); *H04L 7/0334* (2013.01); *H04L 27/14* (2013.01); *H04L 27/148* (2013.01)

(58) Field of Classification Search
CPC ..... H04L 27/06; H04L 25/061; H04L 1/0054; H04L 1/0047; H04L 1/0057; H04L 27/04;
(Continued)

(56) References Cited

U.S. PATENT DOCUMENTS 6,124,806 A * 9/2000 Cunningham ......... G01D 4/004
340/870.02
6,354,999 B1 * 3/2002 Dgany ................... A61B 1/015
600/486
(Continued)

FOREIGN PATENT DOCUMENTS

CN       101447123 A      6/2009
CN       102546013 A      7/2012
(Continued)

OTHER PUBLICATIONS

International Search Report and Written Opinion dated Mar. 7, 2015 which was issued in connection with PCT Patent Application No. PCT/US2015/015851 which was filed on Feb. 13, 2015.
(Continued)

*Primary Examiner* — Sam K Ahn
*Assistant Examiner* — Sarah Hassan
(74) *Attorney, Agent, or Firm* — GE Global Patent Operation (57) ABSTRACT

The present disclosure relates to a superposed signal sampling apparatus, including: a signal receiving module, a signal extracting module, and a signal output module. The signal receiving module is used to receive a superposed signal. The signal extracting module is used to determine whether the received superposed signal is within a preset threshold range of a direct current signal; if the received superposed signal is within the threshold range, extract a previously received signal as a direct current signal to be output; and if the received superposed signal is beyond the
(Continued)

threshold range, extract a currently received signal as a direct current signal to be output. The signal output module is used to integrate the direct current signal extracted by the signal extracting module, and then output the direct current signal. The present disclosure further relates to a superposed signal sampling method.

10 Claims, 6 Drawing Sheets

(51) Int. Cl.
*H04L 25/06* (2006.01)
*H04L 7/033* (2006.01)
*H04L 27/14* (2006.01)
*H04L 27/148* (2006.01)

(58) Field of Classification Search
CPC . H04L 7/0334; H04L 1/00; H04L 2027/0067; H04L 2027/0069; H04L 7/042
USPC .......................................... 370/328; 340/511
See application file for complete search history.

(56) References Cited

U.S. PATENT DOCUMENTS

| | | | | |
|---|---|---|---|---|
| 7,223,556 | B1 * | 5/2007 | Zhou | A61K 47/48361 435/183 |
| 2001/0044283 | A1 | 11/2001 | Yajima | |
| 2003/0119714 | A1 * | 6/2003 | Naylor | A61K 31/00 514/1 |
| 2004/0072319 | A1 * | 4/2004 | Nash | C07K 14/4702 435/226 |
| 2005/0007249 | A1 * | 1/2005 | Eryurek | G05B 23/027 340/511 |
| 2007/0041992 | A1 * | 2/2007 | Frevert | A61K 39/0008 424/191.1 |
| 2008/0236679 | A1 * | 10/2008 | Esposito | F16K 7/14 137/487.5 |
| 2012/0020430 | A1 * | 1/2012 | Haase | H03M 3/438 375/295 |
| 2012/0259571 | A1 * | 10/2012 | Kang | H04B 17/21 702/85 |

FOREIGN PATENT DOCUMENTS

| | | |
|---|---|---|
| CN | 102590692 A | 7/2012 |
| CN | 103091561 A | 5/2013 |
| CN | 103117734 A | 5/2013 |
| CN | 203054093 U | 7/2013 |
| CN | 103326878 A | 9/2013 |

OTHER PUBLICATIONS

First Office Action and Search issued in connection with corresponding CN Application No. 201410092951.6 dated Aug. 29, 2017.

* cited by examiner

SUPERPOSED SIGNAL SAMPLING APPARATUS AND SAMPLING METHOD

TECHNICAL FIELD

The present disclosure relates to a signal sampling apparatus and method, and in particular, to a sampling apparatus and method that are used to extract a direct current signal from a superposed signal of a direct current signal and an alternating current signal.

BACKGROUND

An open Highway Addressable Remote Transducer (Highway Addressable Remote Transducer, HART) communication protocol is a communication protocol used between a smart field instrument and a control room device. An HART apparatus provides communication of relatively low bandwidth and proper response time, and a HART technology has tended to be mature at home and abroad and has become one global industrial standard of smart instruments.

The HART protocol uses a frequency shift keying (Frequency-shift keying, FSK) signal based on Bell (Bell) 202 standard, where an alternating current digital signal of an amplitude of 0.5 mA is superposed on a 4-20 mA direct current analog signal so as to perform bidirectional digital communication, a data transmission rate is 1.2 kbps, and alternating current digital signal frequencies that represent place values "0" and "1" are separately 2200 Hz and 1200 Hz. Because an average value of the FSK signal is 0, no interference is caused to the direct current analog signal when the low-level alternating current digital signal is superposed on the 4-20 mA direct current analog signal, thereby ensuring compatibility with an existing analog system.

Although the alternating current signal superposed on the direct current signal does not cause any interference to the direct current signal in a transmission process, the direct current signal is affected by the alternating current signal when it is required to extract the direct current signal from the superposed signal, so that a deviation occurs between an extracted direct current signal and an original signal. In a traditional data sampling method, dedicated data processing hardware may be used to extract the direct current signal from the superposed signal. Although a direct current signal of relatively high precision may be extracted in this method, costs increase because a dedicated hardware device is introduced. In some other traditional methods, the direct current signal also is extracted by only programming existing hardware; however, precision of most extracted direct current signals is still relatively low and cannot meet a requirement of subsequent data processing in some cases.

Therefore, it is necessary to provide a new superposed signal sampling apparatus and sampling method to solve the foregoing problem.

BRIEF DESCRIPTION

One or more aspects are summarized in the present disclosure to facilitate a basic understanding of the present embodiments, where the brief description does not extend the overview, and is neither intended to identify certain elements, nor intended to draw out of its range. On the contrary, the main purpose of the brief description is to present some concepts of the present embodiments in a simplified form before more detailed descriptions are presented below.

The present disclosure provides a superposed signal sampling apparatus, configured to extract a direct current signal from a superposed signal, where the apparatus includes: a signal receiving module, configured to receive a superposed signal; a signal extracting module, configured to determine whether the received superposed signal is within a preset threshold range of a direct current signal; if the received superposed signal is within the threshold range, extract a previously received signal as a direct current signal to be output; and if the received superposed signal is beyond the threshold range, extract a currently received signal as a direct current signal to be output; and a signal output module, configured to integrate the direct current signal extracted by the signal extracting module, and then output the direct current signal.

The present disclosure further provides a superposed signal sampling method, used to extract a direct current signal from a superposed signal, where the method includes:
  (a) receiving a superposed signal;
  (b) determining whether the received superposed signal is within a preset threshold range of a direct current signal; if the received superposed signal is within the threshold range, performing step (c); otherwise, performing step (d);
  (c) extracting a previously received signal as a direct current signal to be output;
  (d) extracting a currently received signal as a direct current signal to be output; and
  (e) integrating the direct current signal extracted in step (c) or (d) and then outputting the direct current signal, and returning to step (a).

Compared with the prior art, the superposed signal sampling apparatus and method in the present disclosure use a determining criterion of a set threshold range to determine a direct current signal to be extracted. This method is simple and practicable, and precision can be adjusted by adjusting a preset threshold range. In addition, the sampling apparatus and method may be directly built in an existing data processing system, without a need to dedicatedly dispose a dedicated hardware device, and therefore no additional costs are added.

BRIEF DESCRIPTION OF DRAWINGS

The present disclosure may be understood in a better way by describing the implementation manners of the present embodiments with reference to the accompanying drawings, and in the accompanying drawings.

DETAILED DESCRIPTION

The following will describe specific implementation manners of the present disclosure. It should be noted that, in the specific description process of these implementation manners, in order to make terse and concise descriptions, it is impossible to describe in the specification all features of an actual implementation manner in detail. It should be understood that, in an actual implementation process of any one implementation manner, as in a process of any one project or design project, in order to achieve the developers' specific goals, or in order to meet system-related or business-related limitations, various specific decisions may usually be made, and the decisions may change from one embodiment to another embodiment. In addition, it can also be understood that, although efforts made in the development process may be complicated and lengthy, for a person of ordinary skill in the art related to the content disclosed in the present application, some changes, such as in design, manufacturing, or production, made based on the technical content disclosed in the disclosure are common technical means, and should be construed that the content of the disclosure is not sufficient.

Unless otherwise defined, the technical terms or scientific terms used in the claims and specification should be the ordinary meaning understood by a person of ordinary skill in the technical field of the present disclosure. "First", "second" and similar words used in the patent application specification and claims do not denote any order, quantity, or importance, but are just used to distinguish different components. "A" or "an" and other similar words do not denote quantity limitations, but denote that at least one exists. "Comprises" or "comprising" and other similar words imply that an element or object appearing before the "comprises" or "comprising" covers enumerated elements or objects and equivalents elements thereof appearing after the "comprises" or "comprising", and other elements or objects are not excluded. "Connected" or "coupled" and other similar words are not limited to physical or mechanical connections, but may include electrical connections, either in a direct or indirect manner.

Figure 1:
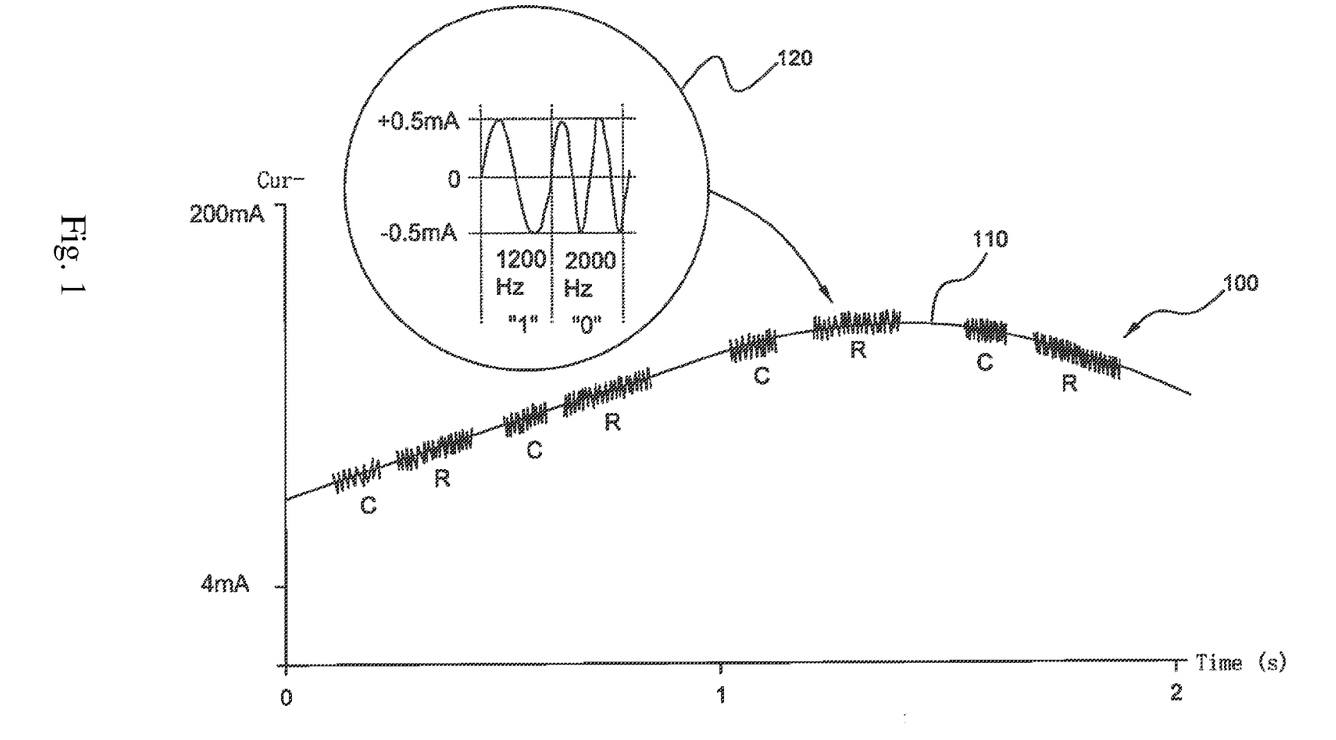
FIG. 1 is a schematic diagram of a HART protocol signal.

Refer to FIG. 1, which is a schematic diagram of a HART protocol signal 100. It should be noted that, only one example in which the HART protocol signal 100 is used as a to-be-processed signal is provided in a specific implementation manner; and in another implementation manner, similar signal processing may also be performed on another type of direct-current/alternating-current superposed signal, which is not described in detail herein. It may be known that when a type of the to-be-processed signal changes, a person skilled in the art may perform an adaptive fine adjustment based on a signal change, for example, may adjust a signal threshold range; and specifically may perform an adjustment according to an actual requirement.

In the example in FIG. 1, the HART protocol signal 100 includes one 4-20 mA direct current signal 110 and an alternating current signal 120 that is superposed on the direct current signal 110 and is located in different time ranges. Because the example provided in this implementation manner is a HART protocol signal, an amplitude range of the direct current signal 110 is 4-20 mA; and the alternating current signal 120 includes two frequency bands, that is, frequency bands 2200 Hz and 1200 Hz that represent digital signals "0" and "1", respectively. In addition, the alternating current signal 120 may further include two kinds of signals, where one kind is a command signal (a time range denoted by "C" in the figure), and the other kind is a response signal (a time range denoted by "R" in the figure). In another implementation manner, an amplitude range of a direct current signal in a to-be-processed direct-current/alternating-current superposed signal may be adjusted according to an actual requirement, a frequency of an alternating current signal may also be adjusted according to an actual requirement, and a time interval in which the alternating current signal is superposed on the direct current signal may also be adjusted according to an actual requirement, which is not limited to one implementation manner.

Figure 2:
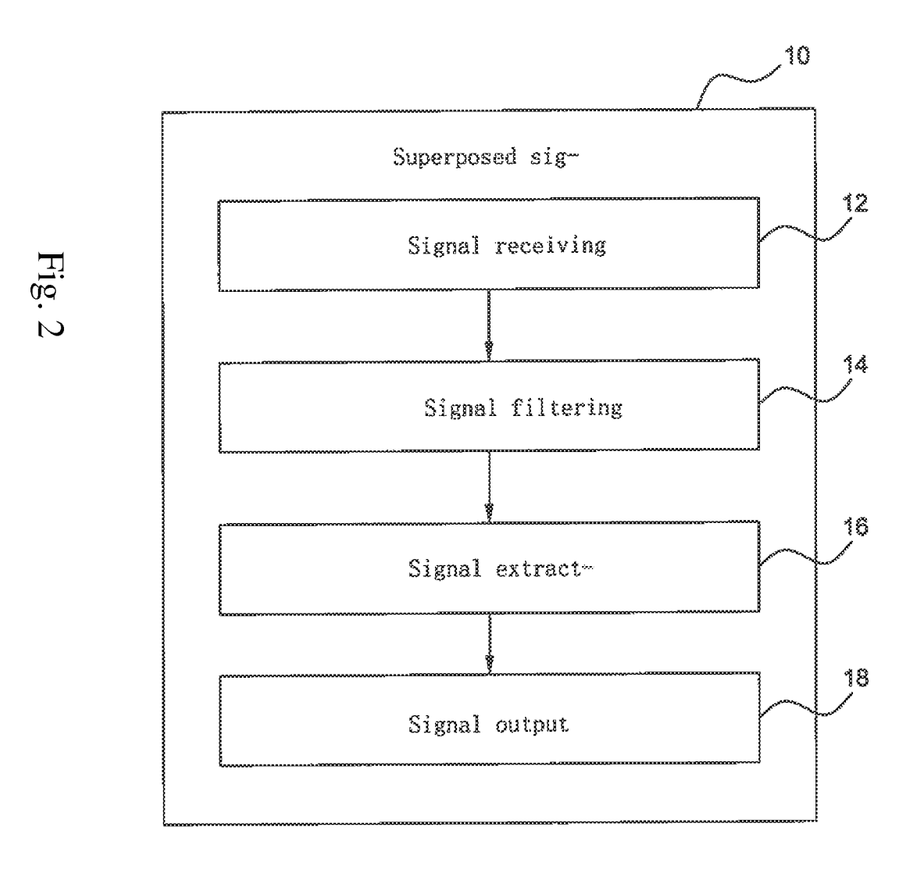
FIG. 2 is a block diagram of an implementation manner of a superposed signal sampling apparatus according to an embodiment.

Refer to FIG. 2, which is a block diagram of an implementation manner of a superposed signal sampling apparatus 10 according to an embodiment. The superposed signal sampling apparatus 10 includes a signal receiving module 12, a signal filtering module 14, a signal extracting module 16, and a signal output module 18. In this implementation manner, the foregoing modules are independent modules. In another implementation manner, any two or more modules in the foregoing modules may also be integrated into one module, or any module in the foregoing modules may further be divided into two or more submodules.

When sampling is performed on a HART protocol signal 100, sampling is separately performed on a direct current signal and an alternating current signal that are on the HART protocol signal 100, so as to perform subsequent data processing according to an obtained independent direct current signal and independent alternating current signal. For example, a function of a corresponding apparatus is adjusted according to a parameter change in a time range in the direct current signal. Because the subsequent data processing is not an invention point in the present disclosure, a specific example is not provided herein. In addition, the superposed signal sampling apparatus 10 in the present invention performs sampling processing only on the direct current signal in the HART protocol signal 100, while a sampling processing part of the alternating current signal may be implemented by using a conventional technology, so that a specific example is not provided herein either.

Generally, the subsequent data processing according to the direct current signal in the HART protocol signal 100 is generally performed by a subsequent data processing system (not shown). To save costs, the superposed signal sampling apparatus 10 may be a part of an internal data processing unit in the subsequent data processing system, for example, a part of a single-chip microcomputer. Because the data processing system is an existing hardware device but not a hardware device disposed independently and dedicatedly, no additional costs are added if the superposed signal sampling apparatus 10 is built in the data processing system. Certainly, if factors such as costs are not considered, an independent hardware device may also be introduced to implement a function of the superposed signal sampling apparatus 10.

Figure 3:
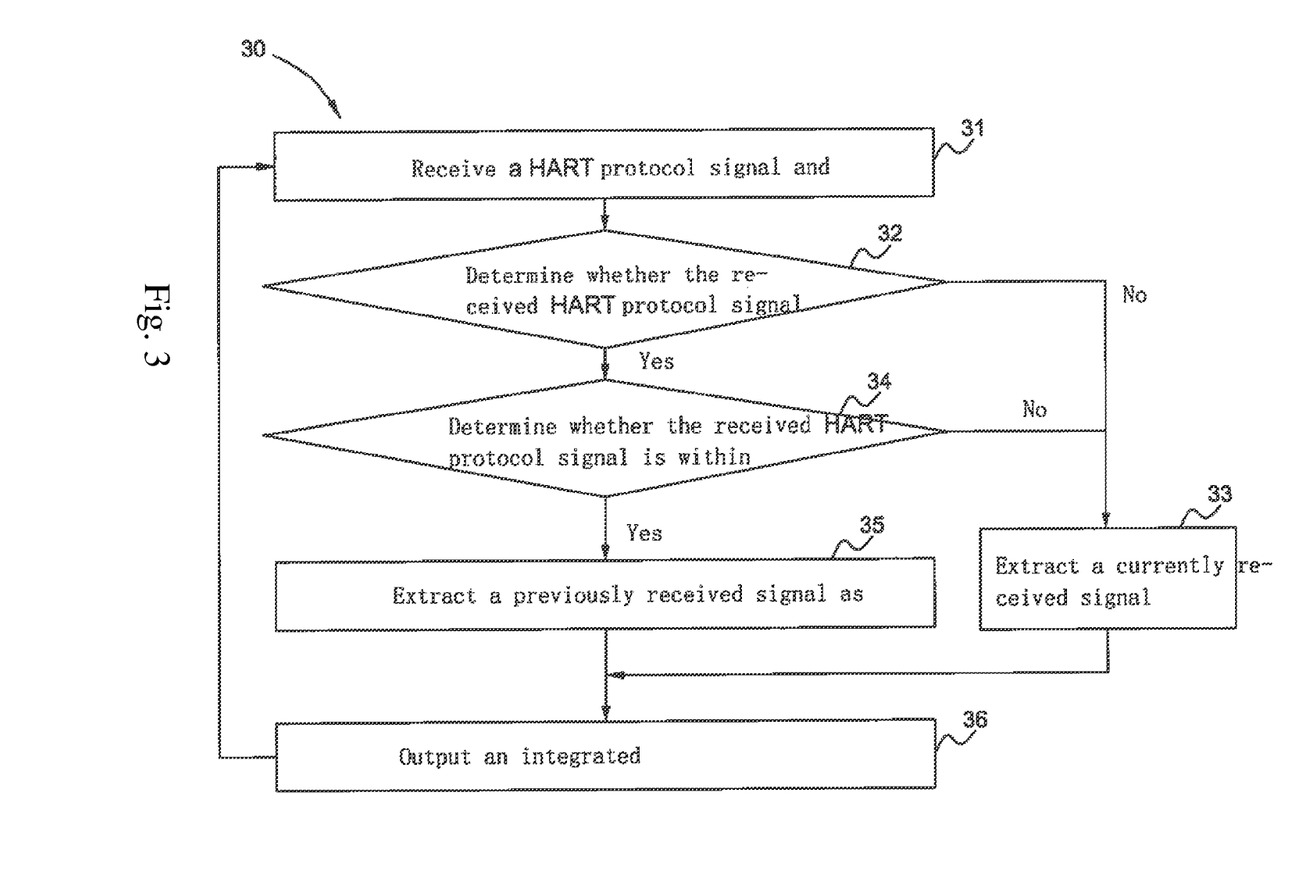
FIG. 3 is a flowchart of an implementation manner of a superposed signal sampling method according to an embodiment.
Figure 4:
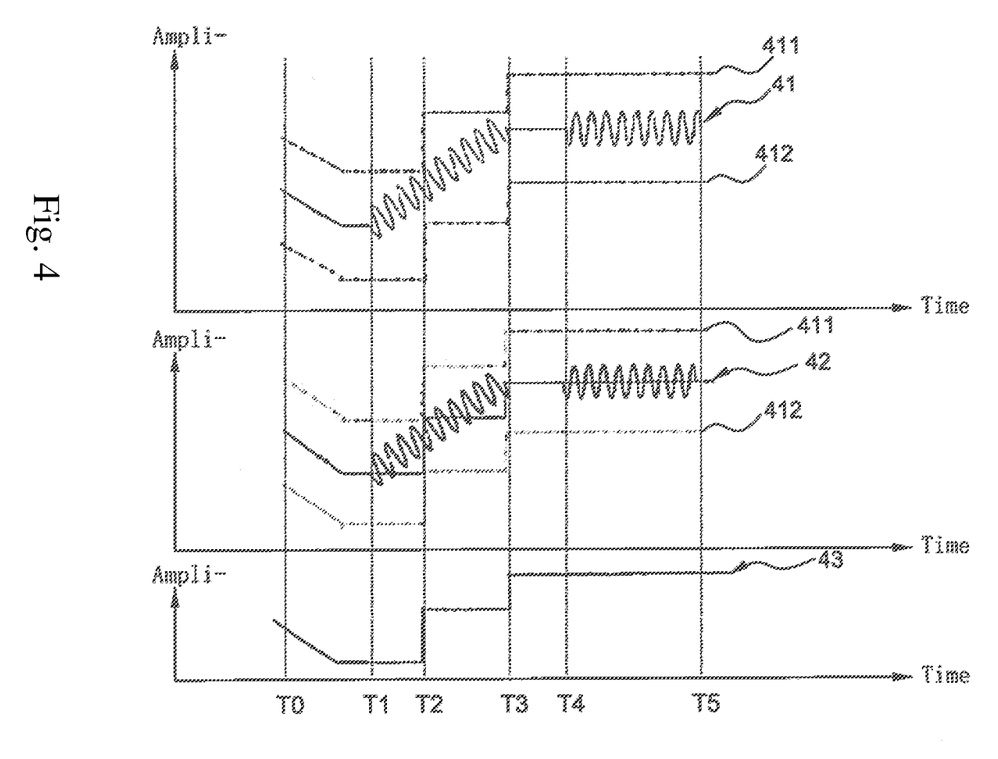
FIG. 4 shows a schematic diagram of different phases in which a superposed signal sampling apparatus and sampling method are used to extract a direct current signal from a HART protocol signal within a time range.

Refer to FIG. 3 with reference to FIG. 2 and FIG. 4. FIG. 3 is a flowchart of an implementation manner 30 of a superposed signal sampling method according to an embodiment. The method 30 is implemented by the superposed signal sampling apparatus 10 by executing an internal program. In this implementation manner, the method 30 includes the following steps.

In step 31, the signal receiving module 12 receives a HART protocol signal (such as the HART protocol signal 100 in FIG. 1), and the signal filtering module 14 performs filtering processing on the HART protocol signal, such as a segment of HART protocol signal 41 after being filtered shown in time range T0-T5 in FIG. 4. Because some noise interference may occur in a signal receiving process in some cases, preliminary filtering processing may be performed selectively, where the filtering herein is filtering processing performed by using a traditional filtering manner on an original signal. For example, 220V alternating current common-mode interference (the signal filtering module 14 is a window filter in this case) may be reduced by using a window filtering processing manner, or proper preliminary filtering processing may be performed by using another traditional filtering processing manner. Noise in the HART protocol signal 41 may be filtered out after the filtering processing, and only a required superposed signal of a direct current signal and an alternating current signal is remained in an ideal condition. In some cases, preliminary filtering processing may not be performed.

In step 32, the signal extracting module 16 determines whether the HART signal 41 is performing HART communication, that is, whether the HART protocol signal 41 is in a transmission state that the alternating current signal is superposed on the direct current signal. For example, time ranges T0-T1 and T3-T4 shown in FIG. 4 are a transmission state of only the direct current signal, while other time ranges T1-T3 and T4-T5 are a transmission state that the alternating current signal is superposed on the direct current signal. For a HART protocol signal, one corresponding start state signal is sent when HART communication starts, and one corresponding end state signal is also sent when HART communication ends. That is, when receiving the start state signal, the signal extracting module 16 can determine that HART communication occurs; and when receiving the end state signal, the signal extracting module 16 can determine that HART communication ends. In another implementation manner, time of the transmission state that the alternating current signal is superposed on the direct current signal may also be determined by using another manner, which is not limited to a HART communication manner. If a result of the determining is no, step 33 is to be performed; and if the result of the determining is yes, step 34 is to be performed.

In step 33, because the result of the foregoing determining is the transmission state of only the direct current signal, for example, time range T0-T1 in FIG. 4, a current signal of the received HART signal 41 is a direct current signal that needs to be extracted. Therefore, in this case, the signal extracting module 16 directly extracts the currently received signal as a direct current signal to be output, and then the signal output module 18 outputs the direct current signal in real time to a subsequent data processing system for subsequent processing, that is, performing of step 36. It may also be seen from the schematic diagram shown in FIG. 4 that, in time range T0-T1 and time range T3-T4, both an extracted signal 42 and an output signal 43 are the same as the received signal 41.

In step 34, because the result of the foregoing determining is the state that the alternating current signal is superposed on the direct current signal, for example, time range T1-T3 in FIG. 4, the received HART signal 41 is a superposed signal and cannot be directly extracted as a direct current signal to be output. In this case, the signal extracting module 16 compares the received HART signal 41 with a preset threshold range, for example, a threshold range between curves 411 and 412 in the figure, and the threshold range may be determined according to a precision requirement of a direct current signal that needs to be extracted, where a higher precision requirement indicates a smaller threshold range; and a lower precision requirement indicates a larger threshold range. When a value of the HART signal 41 falls within the threshold range, for example, within time range T1-T2, step 35 is to be performed; otherwise, step 33 is to be performed.

In step 35, in this case, the value of the HART signal 41 falls within the threshold range, and therefore it is considered that a direct current signal in the HART signal 41 does not have an amplitude change itself. The deviation is due to interference of an alternating current signal on the HART signal 41, and therefore, in this case, a previously received signal is extracted as a direct current signal to be output, for example, time range T1-T2 in FIG. 4, and the extracted signal 42 keeps a signal value at time point T1 all the time. On the contrary, if the value of the HART signal 41 falls beyond the threshold range, step 33 is to be performed directly after step 34, that is, in this case, it is considered that a change of the direct current signal itself in the HART signal 41 causes the deviation greater than the threshold range. Therefore, the currently received signal is extracted as a direct current signal to be output. For example, a signal at time point T2 in FIG. 4 is greater than the threshold range, and therefore a value of the signal is directly used as a direct current signal to be output.

In step 36, according to the signals generated in the foregoing step 33 and step 35, the signal output module 18 integrates the signals in the two steps and then outputs the signals. Then, return to step 31 and repeat the foregoing steps. As shown in FIG. 4, the initial signal 41 is output as the final output signal 43 after the foregoing steps and by integrating the extracted signal 42, where the final output signal 43 is a direct current signal part of the initial signal 41. Extraction precision of the direct current signal part may be implemented by adjusting the threshold range according to a requirement, which is quite convenient.

Figure 5:
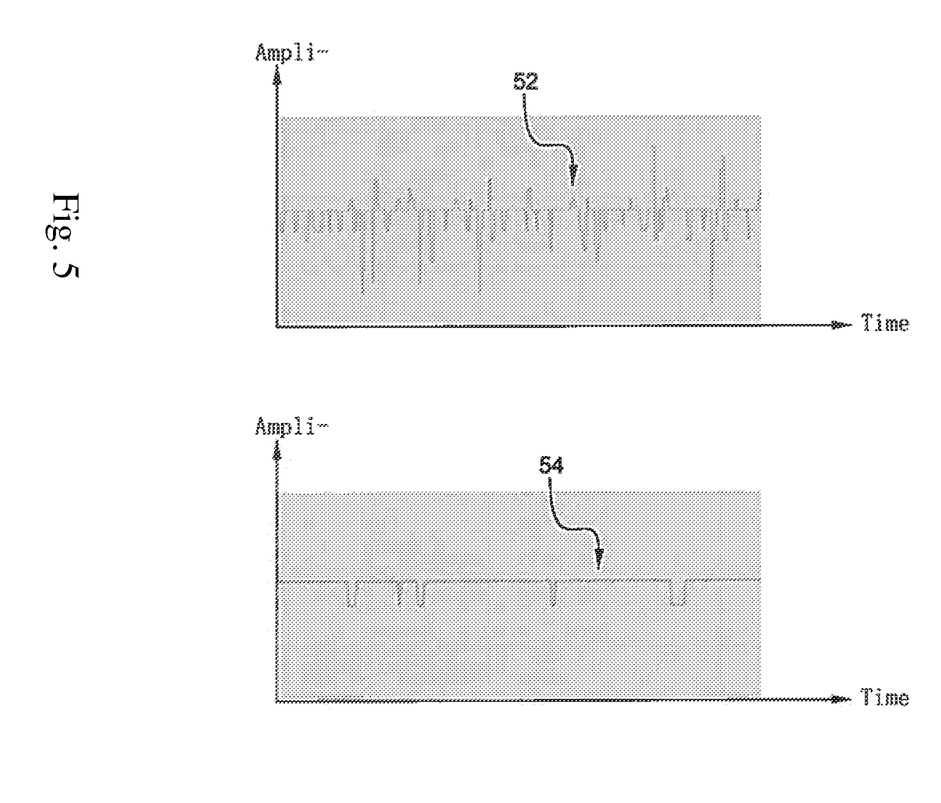
FIG. 5 shows a simulation comparison diagram of direct current signals obtained by applying a traditional sampling method and by applying a sampling method.

Refer to FIG. 5. The figure above is an output signal 52 of a HART signal after step 31, and a direct current signal in this case is still greatly interfered by an alternating current signal, which is difficult for a subsequent device to acquire a value represented by the direct current signal. In addition, the figure below is an output signal 54 of a HART signal after the foregoing steps 31-36. Compared with the signal 52, the output signal 54 has obviously improved precision.

Figure 6:
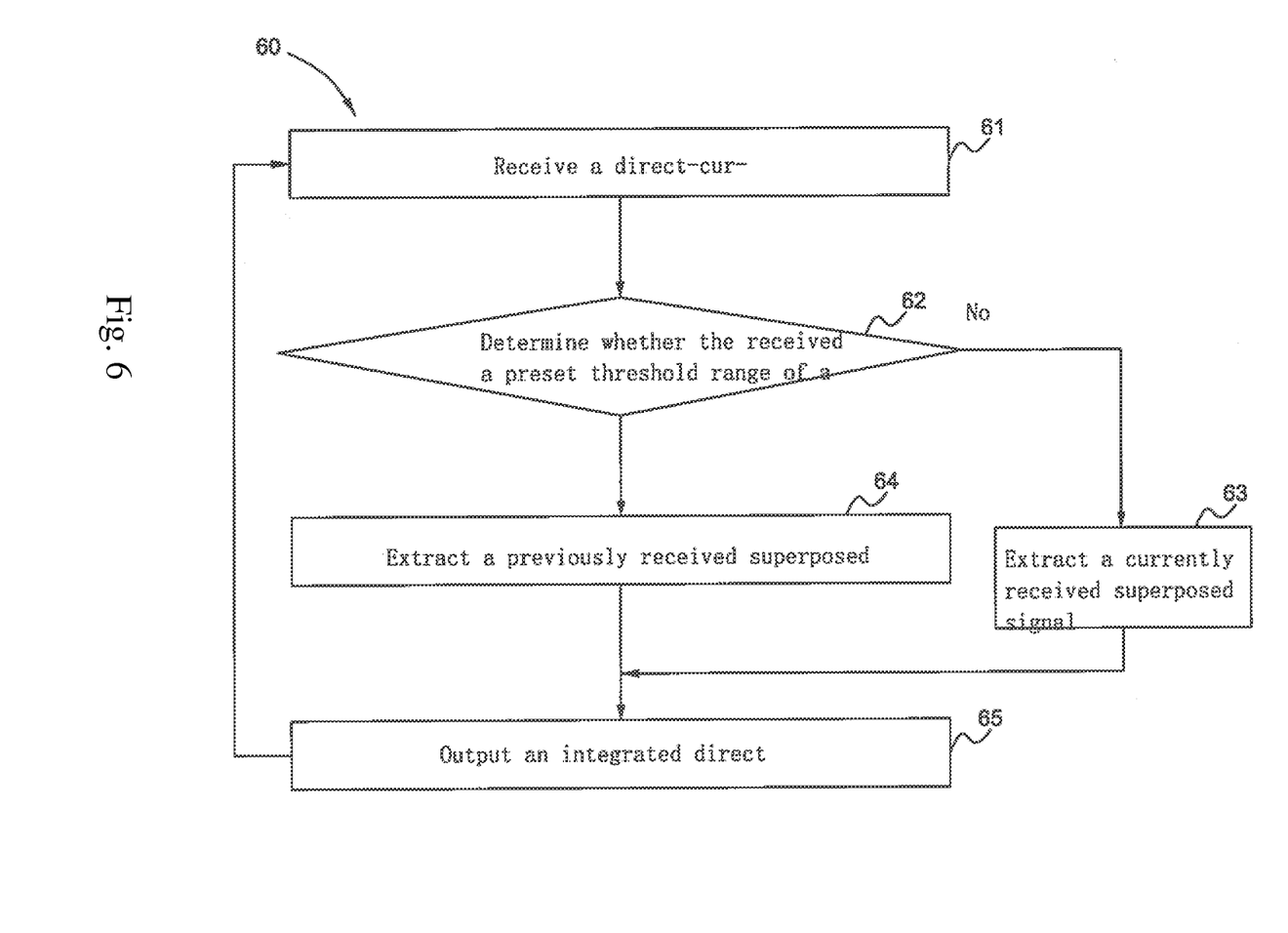
FIG. 6 is a flowchart of another implementation manner of a superposed signal sampling method according to an embodiment.

Continue to refer to FIG. 6, which is a flowchart of another implementation manner 60 of a superposed signal sampling method according to an embodiment. The method 60 is not only applicable to the foregoing exemplary HART protocol signal but also is applicable to any direct-current/alternating-current superposed signal. Compared with the method 30 in FIG. 3, steps 61, 62, 63, 64, and 65 in the method 60 are respectively corresponding to step 31, 34, 33, 35, and 36 in the method 30, that is, step 32 in the method 30 is omitted in the method 60. This is because some direct-current/alternating-current superposed signals are direct-current/alternating-current superposition all the time, and there is no time range in which only direct current transmission exists. Therefore, there is no need to set step 32. Specific operations of the method 60 are not described further. For details, refer to related description of corresponding parts in the method 30 in the foregoing paragraphs.

Although the present disclosure is described with reference to specific implementation manners, a person skilled in the art should understand that, many modifications and variations may be made for the present disclosure. Therefore, it should be noted that, intention of the claims lies in all the modifications and variations covered in a real concept and scope of the present disclosure.

What we claim is:

1. A superposed signal sampling apparatus, configured to extract a direct current signal from a superposed signal, wherein the apparatus comprise a processor configured to:
   receive a superposed signal;
   determine whether the received superposed signal is within a preset threshold range of a direct current signal; wherein if the received superposed signal is within the threshold range, the signal extracting module will extract a previously received signal as a direct current signal to be output; and if the received superposed signal is beyond the threshold range, the signal extracting module will extract a currently received signal as a direct current signal to be output;
   integrate the direct current signal extracted by the signal extracting module, and then output the direct current signal; and
   perform filtering processing on the superposed signal received by the signal receiving module.

2. The superposed signal sampling apparatus according to claim 1, wherein the processor comprises a window filter.

3. The superposed signal sampling apparatus according to claim 1, wherein the superposed signal is a HART protocol signal.

4. The superposed signal sampling apparatus according to claim 3, wherein the processor is further configured to determine whether the received HART protocol signal is performing HART communication; wherein if the HART protocol signal is not performing HART communication, the processor will extract the currently received signal as a direct current signal to be output; and if the HART protocol signal is performing HART communication, the processor will continue to perform determining of the foregoing threshold range.

5. The superposed signal sampling apparatus according to claim 2, wherein the superposed signal is a HART protocol signal.

6. A superposed signal sampling method, used to extract a direct current signal from a superposed signal, wherein the method comprises:
   (a) receiving a superposed signal;
   (b) determining whether the received superposed signal is within a preset threshold range of a direct current signal; if the received superposed signal is within the threshold range, performing step (c); otherwise, performing step (d);
   (c) extracting a previously received signal as a direct current signal to be output;
   (d) extracting a currently received signal as a direct current signal to be output;
   (e) integrating the direct current signal extracted in step (c) or (d), and then outputting the direct current signal, and returning to step (a),
   wherein, prior to step (b) filtering processing on the received superposed signal is performed.

7. The superposed signal sampling method according to claim 6, wherein the filtering processing is a window filtering processing.

8. The superposed signal sampling method according to claim 6, wherein the superposed signal is a HART protocol signal.

9. The superposed signal sampling method according to claim 8, before step (b), further comprising the following step: determining whether the received HART protocol signal is performing HART communication; if the received HART protocol signal is performing HART communication, performing step (b); otherwise, performing step (d).

10. The superposed signal sampling method according to claim 7, wherein the superposed signal is a HART protocol signal.

* * * * *